Figure 7:
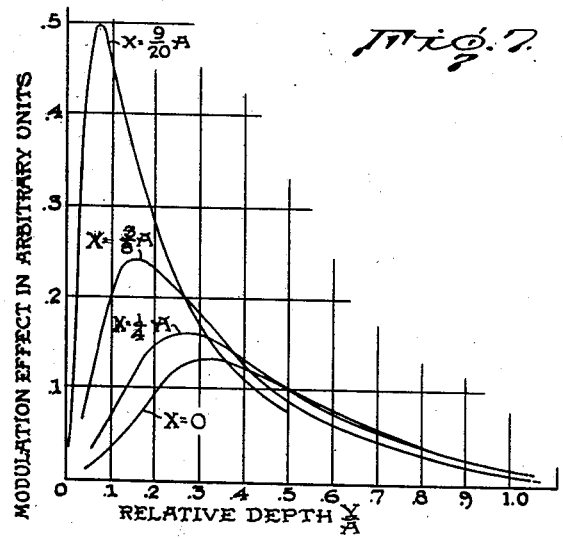

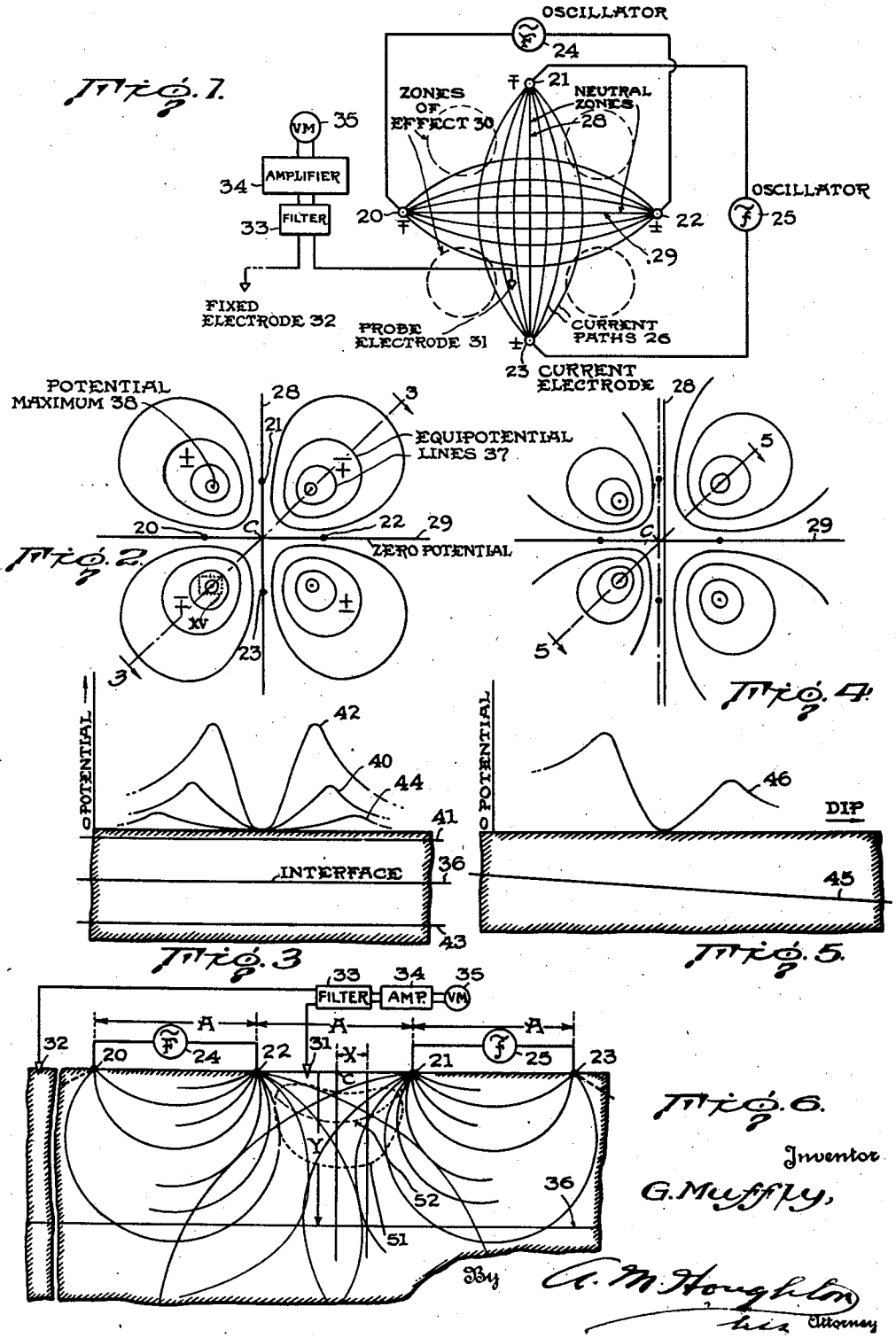

Inventor
G. Muffly,
By G. M. Houghton
his Attorney

July 25, 1944.　　　　G. MUFFLY　　　　2,354,535
ELECTRICAL PROSPECTING
Filed Oct. 11, 1940　　　　3 Sheets-Sheet 3

Inventor
G. Muffly,
By G. M. Houghton
his Attorney

Patented July 25, 1944

2,354,535

UNITED STATES PATENT OFFICE 2,354,535

ELECTRICAL PROSPECTING

Gary Muffly, Penn Township, Allegheny County, Pa., assignor to Gulf Research & Development Company, Pittsburgh, Pa., a corporation of Delaware Application October 11, 1940, Serial No. 360,851

22 Claims. (Cl. 175—182)

This invention or discovery relates to electrical prospecting; and it comprises a method of locating subterranean strata interfaces and other surfaces of discontinuity in the earth, including the steps of energizing the earth by passing at least one alternating current through the earth, exploring for at least one alternating current component of frequency different from the applied current frequency, and selectively detecting said component; and it further comprises an apparatus for electrical prospecting including at least a pair of current electrodes adapted to be set up in conductive relation to the earth, means for applying alternating current to the electrodes, a voltmeter and a filter on the input side of the voltmeter tuned to suppress current components of frequency equal to said applied frequency, and circuit means for applying earth currents to the filter and voltmeter; all as more fully hereinafter set forth and as claimed.

Geophysical prospecting has for its object the investigation of sub-surface geological structures. In particular it is sought to detect and trace subterranean rock strata, faults, ore masses, etc. which are inaccessible to direct inspection. For a prospecting method to be of practical value, it must be capable of giving reasonably accurate quantitative results.

Among the available prospecting procedures the so-called electrical prospecting method has been attractive because of its simplicity as compared with seismograph prospecting or gravity surveys. In typical electrical prospecting procedures, earth resistance or its reciprocal, conductivity, is measured at various places over the area under investigation, by a process involving application of a potential difference between two spaced points in the earth (at current electrodes), with measurement of potential differences at various points between these points (at pickup electrodes). The current path in the earth between the two current electrodes is rather indefinite, but is on the whole shallow when these points are close together and deep when they are far apart, so that by making measurements with different current-electrode spacings, the resistance of various levels in the earth can be studied, and some idea obtained as to the character of the sub-surface. However, this procedure is inherently incapable of yielding quantitatively accurate data, except in certain special situations, because the current paths are vaguely defined; they lack definite boundaries.

It has also been proposed to detect strata interfaces by applying an alternating current to the earth and detecting direct currents due to partial rectification at the interface; but such currents are of the same order of magnitude as the naturally occurring ground currents and are difficult to distinguish from ground currents.

Accordingly in oil field work at least, the more cumbersome seismograph and gravity prospecting methods have found far more utility than electric methods, because of their ability to yield quantitative results.

The main object of the present invention is the provision of a prospecting method of the electrical class, which preserves the simplicity characteristic of electrical methods generally, but is capable of yielding accurate quantitative measurements of many types of geological structures. Another object is the provision of a prospecting method in which an alternating current is passed through portions of the earth, and caused to undergo modification at strata interfaces and other surfaces of discontinuity, with production of new alternating current components at such interfaces, and such current components are detected and measured; the method being independent of the vagueness or lack or definite boundaries of current paths in the earth.

The invention is based on the fact that strata interfaces and other surfaces of discontinuity in the earth behave like non-linear impedances. Impedance is defined by the expression $$Z = \sqrt{\left(WL - \frac{1}{WC}\right)^2 + R^2}$$

wherein L is inductance, W is angular velocity ($2\pi$ times the frequency) C is capacitance, and R is resistance. Impedance is the counterpart of resistance in non-alternating current systems. An impedance is termed non-linear if equal increments of voltage or current applied to it do not correspond to equal increments of current or voltage respectively passed by it. That is, if the voltage-current function of the impedance is a straight line, it is a linear impedance, but if this function is any sort of curve, the impedance is termed non-linear. A non-linear impedance gives rise to rectification and modulation.

According to the present invention alternating currents, usually of two different frequencies, are applied at spaced points in the earth, such that the current fields overlap each other at least in part. If subterranean interfaces exist in the region, modulation takes place thereat, with production of alternating current components of frequencies different from the applied frequencies; notably a component having a frequency equal to the sum of the applied frequencies, and a component having a frequency equal to the difference of the applied frequencies. These components are quite weak with respect to the applied frequencies but by suitable means they can be and are detected and measured at various points over the terrain under investigation. From such measurements, the depth of the interface, its dip and other characteristics can be determined quantitatively.

In other words, the invention makes use of the fact that alternating currents are modulated at stratum interfaces with production of distortion components, including side bands. The term distortion component refers to currents of all frequencies, other than the applied frequency or frequencies. The useful products of the modulation include a lower side band and an upper side band, respectively equal to the difference and the sum of the higher and lower frequencies. Side bands such as produced in the present invention, by modulation of two single frequencies by each other, consist of single frequencies and may be termed side frequencies.

The invention is capable of being practiced with a wide variety of electrode arrangements, and the geometry is quite flexible; the essential thing in all cases (except for a simplified embodiment) being the application of two different alternating current frequencies to the earth at spaced points, and measurement of the sum or difference frequency components at various points in the region. The invention is equally applicable to surface or "horizontal" prospecting and to well-bore or "vertical" prospecting. The embodiment of the invention in bore logging is disclosed and claimed in my application Serial No. 360,852, filed concurrently herewith, entitled improvements in bore logging. In surface prospecting it is useful for areal surveys and also for profile surveys. The invention is applicable also to induced currents and electromagnetic waves.

The invention has the important advantage, inter alia, that the disturbing effect of natural ground currents, which are direct or slowly fluctuating, is completely obviated, as alternating currents are measured and are employed in computation.

Figure 8:
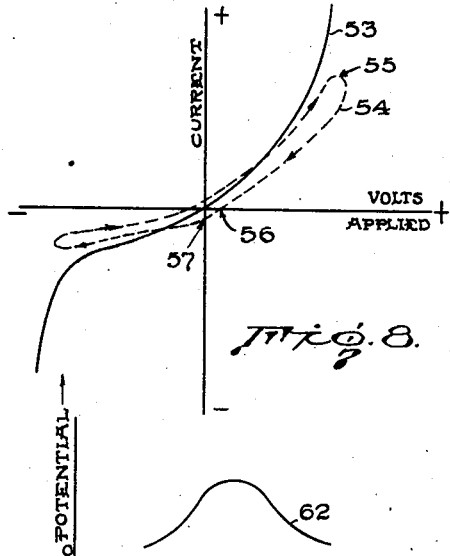
Figure 9:
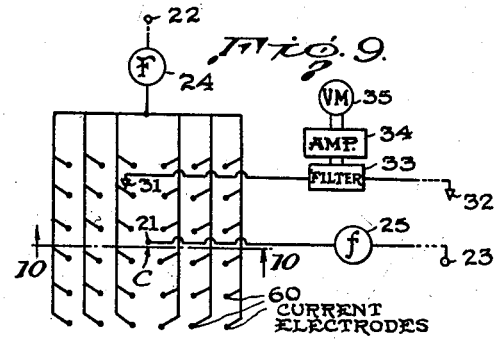
Figure 10:
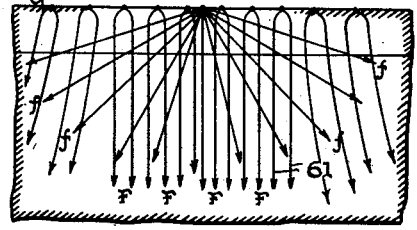
Figure 11:
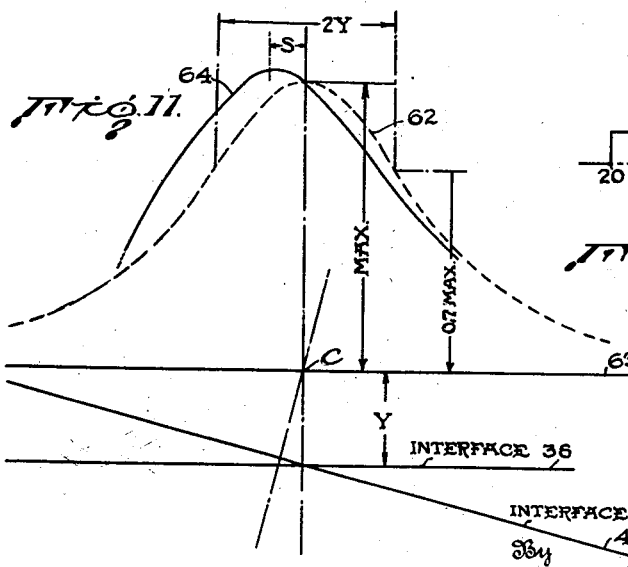
Figure 12:
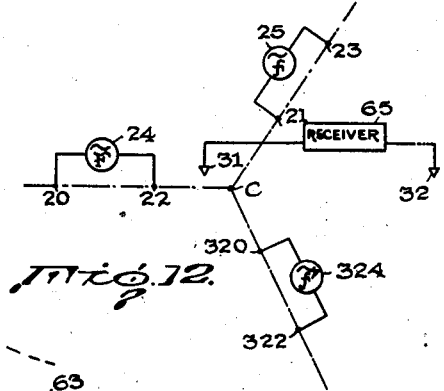
Figure 13:
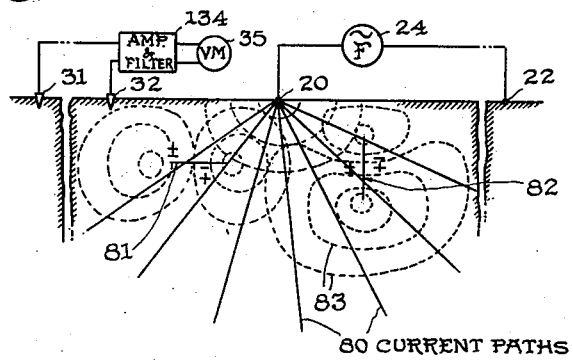
Figure 14:
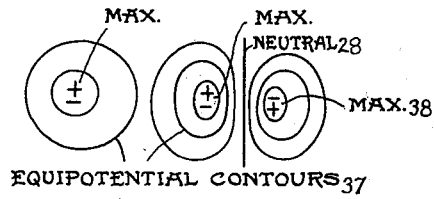
Figure 15:
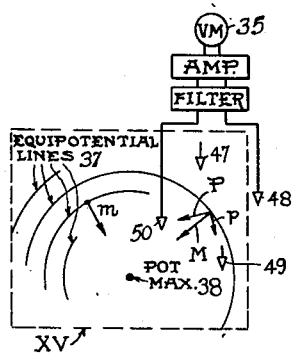

In the accompanying drawings there are shown diagrams illustrative of various modes of carrying out the invention and of the principles upon which it is based, and illustrations of apparatus within the purview of the invention and useful in the performance of the method. In the drawings, Fig. 1 is a diagram illustrative of one good mode of practicing the invention in surface prospecting, Fig. 2 is a diagram, drawn to a smaller scale, of the potential relations obtaining in the Fig. 1 system, Fig. 3 is a sectional view taken along line 3—3 of Fig. 2 through the earth, Fig. 4 is a diagram corresponding to Fig. 2 for a region wherein a dipping interface is present, Fig. 5 is a sectional view taken along line 5—5 of Fig. 4, Fig. 6 is a sectional view of a portion of the earth in which a modified form of the invention is set up, Fig. 7 is a diagram of potential relations corresponding to Fig. 6, Fig. 8 is a diagram illustrative of the characteristics of non-linear impedances, Fig. 9 is a view of a modified electrode arrangement within the purview of the invention, Fig. 10 is a section through the earth taken along line 10—10 of Fig. 9, but showing additional series of current electrodes and the divergent paths of current flowing from those at the outside edges of the assembly, Fig. 11 is a diagram illustrative of the potential relations existing in the system of Figs. 9 and 10, Fig. 12 is a plan view of a modification of the invention utilizing three applied frequencies, Fig. 13 is a diagrammatic view of a simplified form of the invention utilizing a single applied frequency, Fig. 14 is a diagram illustrative of the potential relations obtaining in the system of Fig. 13, and Fig. 15 is a diagram showing one good way of finding the potential maxima.

Referring to the drawings and more especially to Fig. 1, this figure shows in plan a simple embodiment of the invention of quite general utility, involving the setting up in the earth of two pairs of current electrodes, 20, 21, 22 and 23, advantageously square fashion as shown. Two oscillators 24 and 25 are provided, connected to alternate pairs of electrodes as shown, and adapted to deliver alternating currents of suitable different frequencies, for example $F=100$ cycles and $f=80$ cycles, at a suitable potential. The potential is as high as is practicable and is often of the order of 1000 volts. The oscillators may be alternating-current generators, vacuum-tube circuits, etc. and are of a type capable of accurate control of the emitted frequency. They are advantageously of a type giving a fairly pure sinusoidal wave; that is most of the emitted energy is at a single frequency.

The sides of the electrode square are of the order of a few hundred or a few thousand yards. The considerations governing the electrode spacing are explained below.

The current paths between the electrodes are indicated diagrammatically as curved lines 26. These paths also exist below the surface; the current paths being a sort of hammock-shaped or melon-shaped figure as it were, of no very definite boundaries.

The current paths of each pair of electrodes are horizontal at every point where they pass through a vertical plane midway between the electrodes. As the horizontal current at this plane can pass through no horizontal stratum interfaces, no modulation effects will occur at the junction of the plane and the interface. Lines 28 and 29 are neutral lines on the surface, these being traces of the neutral planes on the surface of the earth. Each pair of electrodes lies in the neutral plane of the other pair. At intermediate zones, modulation effects can occur; such zones being indicated very roughly by dotted lines 30.

In making measurements, a probe electrode 31 and a fixed electrode 32 are employed, electrode 32 being set in the earth advantageously though not necessarily a considerable distance away from the current-electrode square. These electrodes are connected through an electrical filter 33 to an amplifier 34, the output of which is applied to a volt-meter 35. The filter is conveniently tuned to pass one or the other of the sum and difference frequencies, e. g. 20 cycles, or 180 cycles, in the example.

Assuming that the ground below the electrodes is homogeneous, without interfaces, the voltmeter reads zero everywhere (disregarding local polarization effects at the current electrodes). If, however, a surface of discontinuity exists below ground, the voltmeter exhibits a potential, varying as the probe electrode is moved from point to point.

Considering the case of a horizontal stratum interface at a level indicated at 36 (Figs. 2 and 3) of extent very large compared to the region bounded by the four current electrodes, the probe electrode, moved around over the region, reveals the two neutral axes 28 and 29; the measured potential is zero along these lines. The probe reveals the existence of equipotential lines or contours (closed curves) 37, as indicated in Fig. 2, and potential maxima 38, symmetrical with respect to the electrode square, and at a distance from the center of the square which increases with the depth of the interface, as explained in detail below. These potential maxima correspond approximately to maximum modulation of the applied frequencies at the interface; actually the maximum surface potential is slightly farther out than the maximum modulation effect at the interface. The closer the potential maxima lie to the center of the electrode square, the shallower is the interface, and vice versa. Fig. 2 illustrates the particular case where the interface lies at a depth equal to the distance of the current electrodes from the center of the square. Fig. 3, a section taken along line 3—3 of Fig. 2 (a line passing through the center C of the square and bisecting two sides as shown), shows at 40 a potential curve corresponding to the contours shown in Fig. 2. If the strata interface is shallow (e. g. at 41 in Fig. 3) the maximum of the resulting potential curve 42 is closer to the center, and if the interface is deep, e. g. at 43, the potential curve 44 has its maximum farther out. The position of the potential maxima is usually more important than the relative magnitude of the maxima in tracing depth, as the magnitude depends on the nature and condition of the rock strata and other such factors.

Considering the case of an inclined (dipping) strata interface at a level 45 (Figs. 4 and 5) of extent large compared to the region bounded by the four current electrodes, the potential pattern is different. Assuming for the sake of simplicity that the interface dips in a direction parallel to axis 29, the potential pattern revealed by the probe resembles that of Fig. 2. Neutral axis 28 is displaced to the right (down-dip). The potential maxima on the down-dip side of the center are displaced outwardly and are of lower magnitude, and those on the up-dip side are displaced inwardly and are of increased magnitude. From their positions, the depth, the dip and the direction of dip of the interface can be determined. If the interface dips in some other direction than that shown, both neutral axes 28 and 29 will in general be displaced from the symmetrical position of Fig. 2. The potential curve is as indicated at 46 in Fig. 5.

In practice it is relatively simple to trace out these potential patterns, or enough of them to give the desired information. A few measurements along lines crossing the diagonals of the electrode square suffice to determine the neutral lines 28 and 29 and a few measurements in the supposed neighborhood of the potential maxima establish the positions of these maxima. In routine operation, after carrying out a series of electrode square set-ups, trends become apparent and the probable potential pattern in the next set-up of the series is known approximately, so that a very few measurements suffice.

The potential maxima can be located by a triangulation method if desired, as shown in Fig. 15. Fig. 15 shows to an enlarged scale a small region XV in the neighborhood of any of the potential maxima; cf. Fig. 2, lower left quadrant. Four electrodes 47, 48, 49 and 50 are set up in a square smaller than the large current electrode square, at any orientation, somewhere near the supposed maximum point 38. If the small square is set up quite close to the maximum point the equipotential lines are very nearly circular as shown. Potential gradients P and $p$ are measured in succession across diagonally opposite electrodes. From these gradients there can be obtained a vector M at right angles to the equipotential lines in the region of the small square, and as the equipotential lines are nearly circles in this region, vector M points approximately toward the maximum. The operations described are repeated at another place near the supposed maximum, giving a second vector $m$. The intersection of the lines of direction of M and $m$ is approximately at the potential maximum.

The potentials measured are quite small; usually of the order of a fraction of a volt.

The usual precautions are taken to insure good contact of the electrodes with the earth and to avoid local polarization effects at the electrodes.

The spacing of the current electrodes is advantageously made roughly equal to the depth of the strata interface being traced. The invention is primarily intended for utilization in regions where there is one strata interface of modulation properties materially greater than any other interfaces above or below. Such an electrical "marker bed" often occurs in oil fields; it may be the interface between a limestone stratum and a sandstone stratum for example. However, the invention can be employed to advantage in regions where there are two or more widely spaced interfaces, by carrying out successive operations with current-electrode spacings corresponding to the depths (as already approximately known) of the several interfaces. For example, in Figs. 1 to 3, the method may be practiced with short current-electrode spacings to investigate the shallowest interface, and long spacings to investigate the deepest interface.

Advantageously the applied frequencies are such that none of the applied frequencies is an integral multiple of another. If one of the applied frequencies is an integral multiple of another the side-band frequencies are merely harmonics of the lower frequency. For example, the side bands due to waves of 10 and 20 cycles are 10 and 30 cycles, which are the first harmonic (or fundamental) and third harmonic of 10 cycles. However, if the ratio of applied frequencies is sufficiently high, say 8:1 or 10:1, the applied frequencies can just as well be in integral multiple relation. With a 10:1 ratio for example the ninth and eleventh harmonics are generated, which is satisfactory. The advantages of application of plural frequencies are obtained when the ratio is, for example, 10:8:7, or other non-integral-multiple relation.

The invention can be practiced utilizing many other electrode arrangements. Fig. 6 shows a simple embodiment of the invention, especially useful in profile prospecting. The two pairs of current electrodes are set up along a line, as shown. The current paths are as indicated in the figure. The active zone, that is the region where modulation effects are apparent, is indicated roughly by the dotted curve 51, the locus of maximum effect being indicated at curve 52. This can be called the zone of modulation, since this is the region where the product of the two currents is greatest and therefore where the interference or modulation effect is greatest. The currents in this zone of modulation have substantial vertical components passing perpendicularly to the strata. These currents will set up vertically polarized sources of sum and difference frequencies at any stratum interface having non-linear impedance characteristics. A probe electrode 31 is moved around above region 51, in a manner generally similar to that described in connection with Fig. 1. Advantageously, to simplify computation, the separation A between each pair of electrodes is the same and is equal to the separation between proximate electrodes of each pair.

Fig. 7 shows a set of computed curves of modulation effect (at horizontal interfaces) vs. depth for various points underground in a vertical plane through the electrodes of Fig. 6. Horizontal distance from center point C is denoted X; depth is denoted Y. The effect is computed by determining the product of the vertical components of the currents of the two applied frequencies, and hence applies only to horizontal strata. It will be noted in Fig. 6 that the effect is relatively constant over a considerable area, but increases sharply and occurs nearer the surface in the vicinity of the inner electrodes. This puts a pimple on the surface field map, but as this pimple is limited to the region around the inner electrodes, it is not serious.

As in the embodiment of Fig. 1, the most significant measurement is that of the relative position of the potential maxima with respect to the two proximate electrodes, or rather to the point midway between these electrodes. By locating such maxima (or one of them), the depth of the interface can be determined. Dip of the interface is exhibited by asymmetry of the potential curves with respect to the center point.

In employing the system of Fig. 6 for profiling, the far pair of electrodes of one set-up in a series can be used as the near pair in the next set-up. For example, in Fig. 6 the next set-up involves transferring electrodes 20 and 22 to the right of electrodes 21 and 23.

Fig. 8 is a diagram illustrative of the current-voltage relations in a non-linear impedance, such as a strata interface. The curve 53 shows how current changes with applied voltage, positive and negative. If the non-linear impedance is non-inductive, and a given voltage or current is applied to it, the locus of all simultaneous values of voltage and current will merely be a segment of the curve. If, however, there are inductive effects or polarization effects, the locus departs from the curve and becomes a closed curve as indicated in dashed lines at 54, which curve is traversed once for each cycle of electrical energy applied; for example, it is traversed 80 times a second with an applied frequency of 80 cycles. If the applied voltage is sinusoidal and the closed-curve locus is any shape other than a straight line segment or an ellipse centered on the origin, then the impedance is non-linear, because the applied sinusoidal voltage or current gives rise to a distorted wave shape containing components of other than the original frequency. The size of the current-voltage locus loop 54 depends on the applied amplitude. The shape depends on the frequency if the impedance is reactive and depends on the amplitude if the impedance is non-linear. If polarization effects are present as in the earth, the impedance will generally be both reactive and non-linear so that the exact shape of the loop varies in a complicated way with frequency and amplitude. The curve 54 represents the locus for a stratum interface to which a sinusoidal wave of definite amplitude and frequency is applied. The true characteristic of the interface, disregarding polarization and reactive effects might be shown at 53. However, polarization effects cause a loop-shaped locus similar to the dotted curve shown. As the voltage increases from the origin toward maximum point 55 the current sags somewhat below the expected value due to polarization effect. At point 56 the current has ceased entirely but some residual polarization potential remains. When the applied voltage reaches zero at point 57 some reverse current is already flowing due to the polarization charge. The same sort of curve occurs in the opposite quadrant.

Figs. 9, 10 and 11 relate to a modification of the invention, useful for certain purposes and excellent as an illustration of the principles on which the invention depends. In Fig. 9 a large number of current electrodes 60, not as many of which are here shown as in Fig. 10, are all connected together to a source 24 of alternating current. The return electrode 22 is placed at a distance remote from the area so that the current flowing in the earth a short distance below the grouped electrodes and well within the area covered by these electrodes will be vertical and uniform. Fig. 10 shows by paths 61 a current of frequency F flowing vertically into the earth. Another current electrode 21 is placed centrally among the grouped electrodes and is energized by another source 25. The current of frequency f will diverge radially. If there is an interface of proper characteristics in the region common to both currents a third frequency will be set up. If potential of this third frequency is measured across the energized area and plotted, a curve as represented by 62 (Figs. 10 and 11) may be obtained. This curve has a characteristic shape. It spreads out in direct proportion to the depth. If the separation of two points having a certain fraction of the maximum effect is measured, an estimate of depth can be obtained. By an approximate solution it has been found that the separation of two points having 71 per cent of the maximum value is equal to twice the depth (see Fig. 11).

Fig. 11 shows some curves for the set-up just described. The earth's surface is represented at 63 and forms the base line of the curves shown. The level of a horizontal interface is indicated at 36. C is the position of the central electrode. It is assumed that the other electrodes cover all the surrounding area uniformly. The potential curve 62 corresponds to interface 36. It is symmetrical, with the maximum above C. If the interface is sloped as at 45, the curve is shifted as shown at 64. The shift S indicates the amount (and direction) of dip.

In certain cases the electrode grid can be replaced by a shallow body of saline (highly conductive) water, the electrode being arranged to make contact with the underlying earth and insulated from the water.

If desired, more than two frequencies can be applied. Fig. 12 shows an arrangement wherein three frequencies, F, f and f' are applied between electrodes 20 and 22, 21 and 23, and 320 and 322, from three oscillators 24, 25 and 324. This system affords a maximum modulation effect below the center point C. The region is explored with a probe electrode 31 connected to receiver 65, which is a filter-amplifier voltmeter assemblage as described. Increasing the number of frequencies applied results in a more definite direction or localization of the modulation effect, since the maximum will be sharpened by increasing the number of factors in the product. Whatever the number of frequencies applied, interfaces cause secondary fields on the earth's surface.

Some of the advantages of the invention are realized with simplified systems, in which but a single frequency is applied to the earth. Such a system is illustrated by Figs. 13 and 14. In Fig. 13, an electrode 20 is energized with a single source of sinusoidal alternating current 24. The return circuit is through a distant ground 22. The current paths are radial lines 80, more or less straight depending on the earth's resistance distribution and the position of the earth return electrode if it is not remote. If the current passes through any interfaces having non-linear impedance, the original wave shape is distorted. In this way harmonics are generated. Surfaces 81 and 82 are assumed to have such characteristics. Across these surfaces the harmonics appear, and each surface becomes an apparent source of new frequencies. The dotted lines 83 represent approximately the paths of flow of the harmonics generated at these surfaces. The presence of these currents can be detected on the surface, since their field intersects the surface and may be explored with a probe electrode 32 employed as described in connection with Fig. 1. The filtered amplifier 134 is tuned to reject all but the harmonic or harmonics desired. The return circuit is completed through an electrode 31 best placed at a remote point. The probe 32 can be moved about on the surface to determine sufficient data to plot a map of equipotential lines such as is indicated diagrammatically in Fig. 14 which shows roughly the effect that would be obtained from the configuration of Fig. 13. The ± and ∓ marks indicate the relative phase of the three potential maxima shown. The size and intensity of the potential maxima indicate the approximate size and depth of underground structure. The positions and number of maxima depend on the subterranean configuration. It is possible to study the relative strength of different harmonics to determine the nature of the interfaces, since this is an indication of the type of non-linearity existing. For example, if the non-linear impedance curve is symmetrical the distorted wave will be symmetrical and will contain only odd harmonics. If the impedance curve has abrupt bends, the higher harmonics will be more in evidence. Changes of applied frequency often reveal significant data, as the non-linear effects are more or less closely related to electrolytic effects which depend on the length of the current flows in one direction.

What I claim is:

1. A method of locating earth stratum interfaces having non-linear electrical impedance characteristics comprising energizing the earth by passing at least one alternating current through the earth, exploring for at least one alternating current distortion component generated in the earth at an interface, said distortion component being of frequency different from that of the alternating current supplied to the same earth, rejecting alternating currents of the same frequency as the alternating current supplied to the earth and selectively detecting said alternating current distortion component.

2. A method of locating underground stratum interfaces of non-linear electrical impedance characteristics comprising passing at least one alternating current through a portion of the earth, exploring the surface of the earth for an alternating current distortion component indicative of passage of current through an interface, said distortion component being of frequency different from that of the alternating current supplied to the earth, rejecting alternating current of the same frequency as the alternating current supplied to the earth and selectively detecting said alternating current distortion component.

3. The method of claim 2 wherein a plurality of alternating currents are applied to the earth through separate pairs of spaced electrodes, and the potentials are received at an additional pair of spaced electrodes.

4. The method of claim 2 wherein at least two alternating currents are applied through at least two pairs of electrodes, no three of which electrodes lie in the same straight line.

5. The method of claim 2 wherein a plurality of alternating currents are applied, between pairs of points lying at alternate corners of a square.

6. The method of claim 2 wherein at least two alternating currents are applied, between pairs of electrodes lying substantially on the same line.

7. The method of claim 2 wherein potentials are detected between an electrode a relatively great distance away from the points of application of current, and a probe electrode in the neighborhood of said points.

8. A method of locating electrically non-linear earth stratum interfaces comprising passing alternating current of a single frequency through the earth, exploring for at least one harmonic of said frequency generated by passage of said current through an interface and selectively detecting said harmonic.

9. In methods of locating stratum interfaces of non-linear electrical impedance, the steps of passing a low frequency alternating current through the earth, passing through the earth at least one alternating current of a different frequency, exploring for at least one side band resulting from modulation at an interface, and detecting said side band while rejecting currents of the frequencies passed through the earth.

10. The method of claim 9 in which at least two alternating currents of different frequency are separately passed through adjacent overlapping portions of the earth.

11. The method of claim 9 in which the frequencies passed through the earth stand in relation to one another other than a ratio of small whole members.

12. A method of locating a stratum interface having non-linear electrical impedance characteristics comprising passing two alternating currents of different frequency through the earth, exploring for at least one side band resulting from modulation of one of said frequencies by the other in passing through an interface and selectively detecting said side band.

13. The method of claim 12 in which the side band frequencies explored for include at least one frequency equal to the sum of the frequencies of the two alternating currents.

14. The method of claim 12 in which the side band frequencies explored for include at least one frequency equal to the difference between the frequencies of the two alternating currents.

15. A method of locating stratum interfaces having non-linear electrical impedance characteristics comprising passing an alternating current of definite frequency through a portion of the earth, simultaneously passing a second alternating current of different frequency through a different portion of the earth overlapping said first portion, exploring for at least one alternating current distortion component generated in the earth at an interface due to modulation of said alternating currents at the interface, and selectively detecting said distortion component.

16. The method as in claim 15 in which the higher frequency passed through the earth is a non-integral multiple of the lower frequency passed through the earth.

17. The method as in claim 15 in which the frequency of the distortion component detected is the sum of the frequency of the two currents passed through the earth.

18. The method of claim 15 in which the frequency of the distortion component detected is the difference between the frequencies of the two currents passed through the earth.

19. A method of prospecting which comprises simultaneously establishing and maintaining alternating currents of at least two different frequencies between at least two spaced points in conductive relation to the earth, receiving alternating current potentials in the earth, filtering out all input frequencies, and measuring the steady state potential of the alternating current components produced by modulation of the input frequencies at a strata interface passed by the filter.

20. A method of locating subsurface interfaces which comprises establishing and maintaining at least one alternating current in the earth, detecting currents in the earth, filtering out from the detected currents all those of input frequency, and measuring the steady state potential of the alternating current components produced by modulation of the input frequencies at a strata interface passed by the filter.

21. An apparatus organization for electrical prospecting comprising a plurality of oscillators adapted to generate currents of different frequencies, at least a pair of spaced electrodes in conductive relation to the earth, circuit means for applying current from the oscillators to the electrodes, and receiving means in current-receiving relation to the earth comprising a filter tuned to reject all input frequencies and a voltmeter arranged to exhibit frequencies produced by modulation of the input frequencies at a strata interface passed by the filter.

22. The apparatus of claim 21 wherein the oscillators are of a type generative of a substantially pure sine wave.

GARY MUFFLY.

CERTIFICATE OF CORRECTION.

Patent No. 2,354,535.                        July 25, 1944.

GARY MUFFLY.

It is hereby certified that error appears in the printed specification of the above numbered patent requiring correction as follows: Page 1, second column, line 25, for "or" second occurrence, read --of--; page 5, first column, line 66, for "the" before "current" read --time--; and second column, line 2, claim 1, before "earth" strike out --same--; and that the said Letters Patent should be read with this correction therein that the same may conform to the record of the case in the Patent Office.

Signed and sealed this 29th day of August, A. D. 1944.

Leslie Frazer (Seal)                                Acting Commissioner of Patents.